United States Patent [19]

Lang et al.

[11] 4,013,926

[45] Mar. 22, 1977

[54] CIRCUIT BREAKER WITH IMPROVED TRIP ACTUATOR AND UNDERVOLTAGE RELEASE MECHANISM

[75] Inventors: Walter W. Lang, Beaver Falls; John A. Wafer, Monroeville; Walter V. Bratkowski, McKeesport; Suresh K. Bhate, Pittsburgh, all of Pa.

[73] Assignee: Westinghouse Electric Corporation, Pittsburgh, Pa.

[22] Filed: July 11, 1975

[21] Appl. No.: 595,184

[52] U.S. Cl. .................................... 361/115; 335/7; 361/92

[51] Int. Cl.[2] .......................................... H02H 3/38

[58] Field of Search ................. 317/58, 31; 335/20, 335/7, 178, 180, 6

[56] References Cited

UNITED STATES PATENTS

| | | | |
|---|---|---|---|
| 1,582,987 | 5/1926 | Hart | 335/180 |
| 2,278,971 | 4/1942 | Boehne | 335/180 X |
| 3,088,009 | 4/1963 | Perez Del Valle | 335/6 |
| 3,566,320 | 2/1971 | Bakes | 335/180 X |
| 3,688,227 | 8/1972 | Hong | 335/7 |

*Primary Examiner*—J. D. Miller
*Assistant Examiner*—Patrick R. Salce
*Attorney, Agent, or Firm*—Robert E. Converse, Jr.

[57] ABSTRACT

A multipole circuit breaker including a latch release actuator having a trip coil and a hold-in coil coaxially surrounding a plunger and mounted within a hollow cylindrical actuator support frame. The actuator is mounted in association with a latch mechanism and includes a spring biasing the plunger toward release of the latch mechanism. The hold-in coil is responsive to voltage conditions on an external control line and serves to oppose the action of the bias spring and maintain the plunger in a position to prevent release of the latch mechanism when the voltage on the control line is above a predetermined level. The trip coil is connected to an electronic sensing circuit which activates the trip coil upon overcurrent conditions through the circuit breaker contacts to cause the trip coil to aid the action of the bias spring and overcome the action of the hold-in coil to move the plunger into engagement with the latch mechanism, effecting release of the latch mechanism and separation of the circuit breaker contacts.

10 Claims, 4 Drawing Figures

CIRCUIT BREAKER WITH IMPROVED TRIP ACTUATOR AND UNDERVOLTAGE RELEASE MECHANISM

CROSS-REFERENCES TO RELATED APPLICATIONS

The invention is related to material disclosed in the copending U.S. patent application Ser. No. 595,183 (W.E. 45,385), filed July 11, 1975, by Walter W. Lang and John T. Wilson and assigned to the assignee of the present invention.

BACKGROUND OF THE INVENTION

1. Field of the Invention:

The invention relates to circuit breakers, and more particularly to circuit breakers having shunt trip mechanisms with undervoltage release capability.

2. Description of the Prior Art

Circuit breakers are widely used in industrial, commercial, and residential applications to provide protection for electrical apparatus and distribution equipment. Upon overcurrent conditions through a connected circuit, the circuit breaker will automatically open to interrupt current flow through the circuit. In order to protect multi-phase circuits, the circuit breaker must have a plurality of poles, one for each phase of the circuit being protected. Overcurrent conditions through any one of the several phases must cause the circuit breaker to automatically interrupt the current flow therethrough.

In addition to the previously mentioned overcurrent tripping capabilities, certain applications, such as in the mining industry, require a fail-safe undervoltage release or remote tripping capability. This requires that the circuit breaker be tripped whenever a control voltage falls below a predetermined minimum.

Many multipole circuit breakers in the prior art employed a separate trip mechanism for each pole. These trip mechanisms were connected by a pole-to-pole trip bar or similar mechanism so that actuation of any one of the several trip mechanisms would result in a tripping operation on all poles of the circuit breaker. Such a circuit breaker is described in U.S. Pat. No. 3,422,381, issued Jan. 19, 1969 to Julius Toth and assigned to the assignee of the present invention. Undervoltage release capability could be provided by a hold-in type solenoid connected to an external control line. When voltage on this control line fell below a predetermined value the solenoid would release, striking the pole-to-pole trip bar and releasing the latch mechanism of the circuit breaker.

Requirements for more flexible adjustment of time-current tripping characteristics have resulted in the development of circuit breakers employing a single trip actuator energized by an electronic circuit which senses the current flow through each phase of the multipole circuit breaker. Overcurrent conditions through one or more phases of the circuit breaker will cause the electronic circuit to energize the single shunt trip actuator and cause release of the latch mechanism and separation of the circuit breaker contacts. This type of shunt trip actuator eliminated the need for trip bars or other complex pole-to-pole mechanisms. However, it was difficult to modify existing undervoltage release mechanisms for use with circuit breakers which do not employ the pole-to-pole mechanisms. It is desirable, therefore, to provide a circuit breaker incorporating an undervoltage release mechanism compatible with a single shunt trip actuator.

Some prior art shunt trip actuators were supported by a shaped metal U bracket attached to the latch mechanism of the circuit breaker. It is desirable to provide a shunt trip actuator with improved dimensional control and higher performance.

In many circuit breakers, the space available for installation of trip mechanisms and undervoltages release mechanisms is extremely limited. Thus, it is desirable to provide a compact unitary latch release actuator comprising a combined trip actuator and undervoltage release mechanism.

SUMMARY OF THE INVENTION

In accordance with a preferred embodiment of the invention, there is provided a circuit breaker comprising separable contacts, latch means releasable upon actuation to effect separation of the contacts, and a latch release actuator. The latch release actuator comprises a support structure, an actuating member operable between first and second conditions and actuating said latch release mechanism when operated to the second condition, means for biasing the actuating member toward the second condition, means responsive to first and second control signals for operating the actuating member and operable upon receipt of the first signal to operate the actuating member against the action of the biasing means and to maintain the actuating member in the first condition. Upon receipt of the second signal the operating means aids the biasing means and overcomes the action generated in response to the first signal to operate the actuating member to the second condition, release the latch mechanism, and separate the contacts. The circuit breaker also includes means for generating the first signal whenever voltage applied to the generating means rises above a first level, the generating means ceasing generation of the first signal when the applied voltage falls below a second level. Also provided are means coupled to the contacts for generating the second signal upon overcurrent conditions through the contacts.

DESCRIPTION OF THE PREFERRED EMBODIMENT

Figure 1:
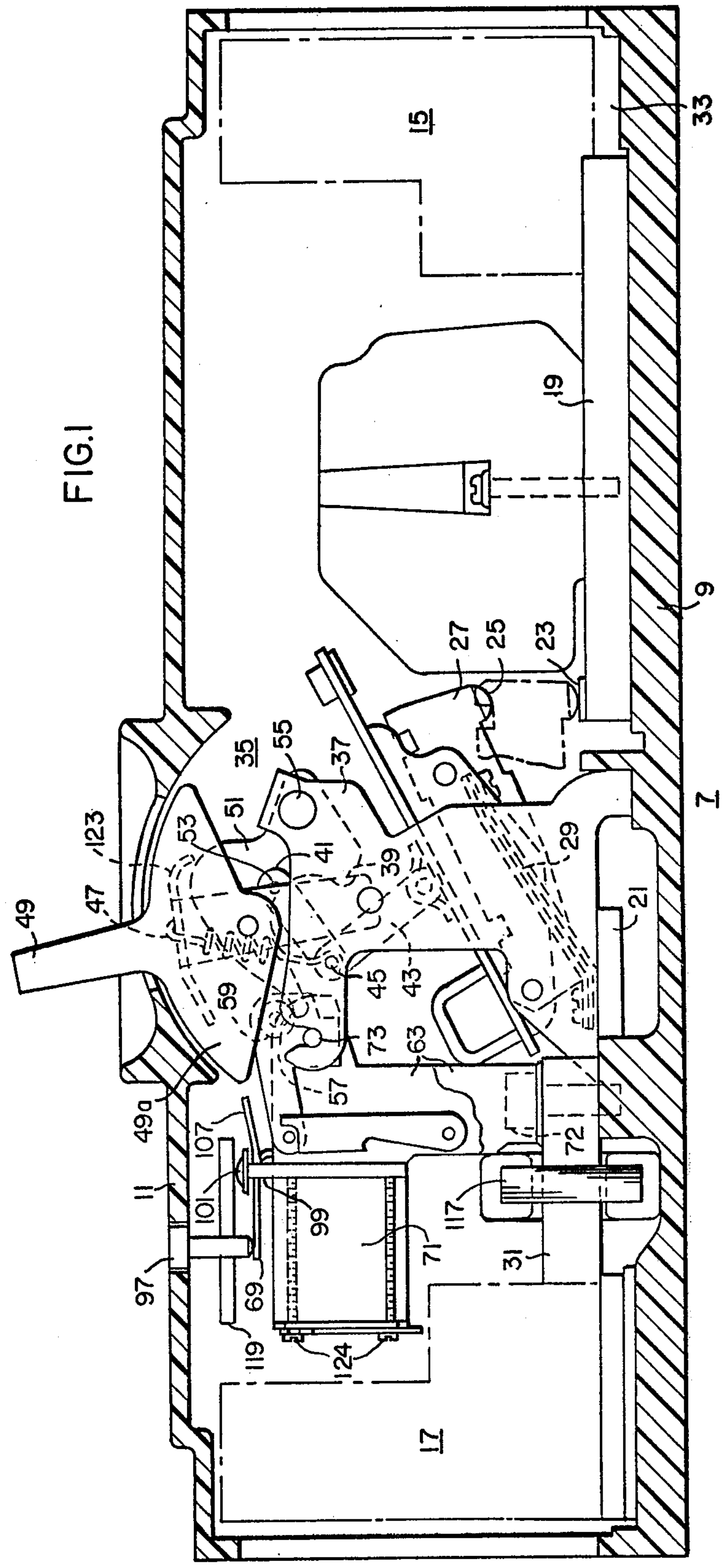
FIG. 1 is a vertical sectional view, with parts broken away, of a circuit breaker employing the principles of the present invention.

Throughout the drawings, like reference characters refer to like members.

A circuit breaker, generally indicated at 7 in FIG. 1, corresponds to that disclosed in U.S. Pat. No. 3,560,683, issued Jan. 24, 1968 to Alfred E. Maier and Albert R. Celerini and assigned to the assignee of the present invention. Thus, certain parts of the circuit breaker 7 will be only briefly described.

The circuit breaker 7 comprises an insulating housing including a molded insulating base 9 with a detachable cover 11. The housing is separated by suitable insulating barrier means into three adjacent insulating compartments for enclosing three complete pole units of the multipole circuit breaker in a manner known in the art. In each pole unit a pair of solderless terminals 15 and 17 are provided at opposite ends of the associated compartment to enable connection of the circuit breaker to an electric circuit.

In each of the three pole unit compartments of the circuit breaker there are spaced conductors 19 and 21, a stationary contact 23 mounted on the conductor 19, a movable contact 25 mounted on a contact arm 27, and a flexible conductor 29 which extends between the contact arm and the conductor 21. The conductor 21 is electrically connected by an associated conductor 31 to the terminals 17. A circuit thus extends through the circuit breaker 7 from the terminal 15 through the elements 19, 23, 25, 27, 29, 21 and 31 to the terminal 17. Although the contact arm 27 is shown in the open position, the closed position is shown in broken lines with the contacts 23, 25 in the closed circuit position. A single operating mechanism, generally indicated at 35, for controlling all three circuit poles, is mounted in the center pole unit of the circuit breaker. The operating mechanism 35 comprises a frame 37 including spaced supporting plate parts mounted on the base 9, a pivoted forked operating lever 39, upper and lower toggle links 41, 43 pivotally connected by means of a knee pivot pin 45, a pair of tension springs 47, and an insulating handle 49. The upper toggle line 41 is pivotally connected to a movable releasable arm or trip member 51 by means of a pin 53. The releasable arm 51 is pivotally supported on the frame 37 by means of the pivot pin 55. The other end of the releasable arm 51 includes a latch surface 57 which is held in a latched position by a roller 59. The roller 59 is part of a trip means generally indicated at 61, as shown more particularly in FIG. 3.

The trip means 61 comprises a frame 63, a cross plate 99, the roller 59, a latch lever 65, a linkage mechanism 67, a reset lever 69, and a release actuator 71. The frame 63 is a U-shaped member, the lower portion of which is secured by a bolt 72 extending into the base 9. The trip means 61 is more particularly described in U.S. Pat. No. 3,928,826, issued Dec. 23, 1975 to Maier et al and assigned to the assignee of the present invention. Thus, the trip means 61 will be only briefly described. The linkage mechanism 67 includes a toggle linkage comprising an upper link 83 pivotally connected at its upper end to the latch lever 65 by a pin 87 and a lower link 85 pivotally connected at its lower end to the frame 63 by a pin 89. The upper links 83 and lower links 85 are pivotally connected to each other by a pin 91. When the circuit breaker is in the closed circuit latched position, the roller 59 is in contact with the surface 57 of the releasable arm 51 and the axis of the pin 91 is slightly to the left (FIG. 3) of a line 93 passing through the axes of the pins 87 and 89. Thus, upward pressure applied by the releasable arm 51 against the roller 59 to cause the lever 65 to rotate counterclockwise and thereby release the arm 51, is resisted by the overcenter toggle mechanism 67, because of the axis of the pin 91.

To trip the circuit breaker 7 from the closed circuit position to the open circuit position, the pin 91 is moved to the right of the line 93 passing through the axes of the pins 87 and 89. The toggle mechanism 67 then collapses to the broken line positions of the upper and lower links as shown in FIG. 3, enabling the lever 65 to rotate counterclockwise, whereby the roller 59 rolls off of the left end of the arm 51 to permit the arm 51 to raise to the unlatched position, as shown by broken line positions of parts 65, 83, 85.

Figure 2:
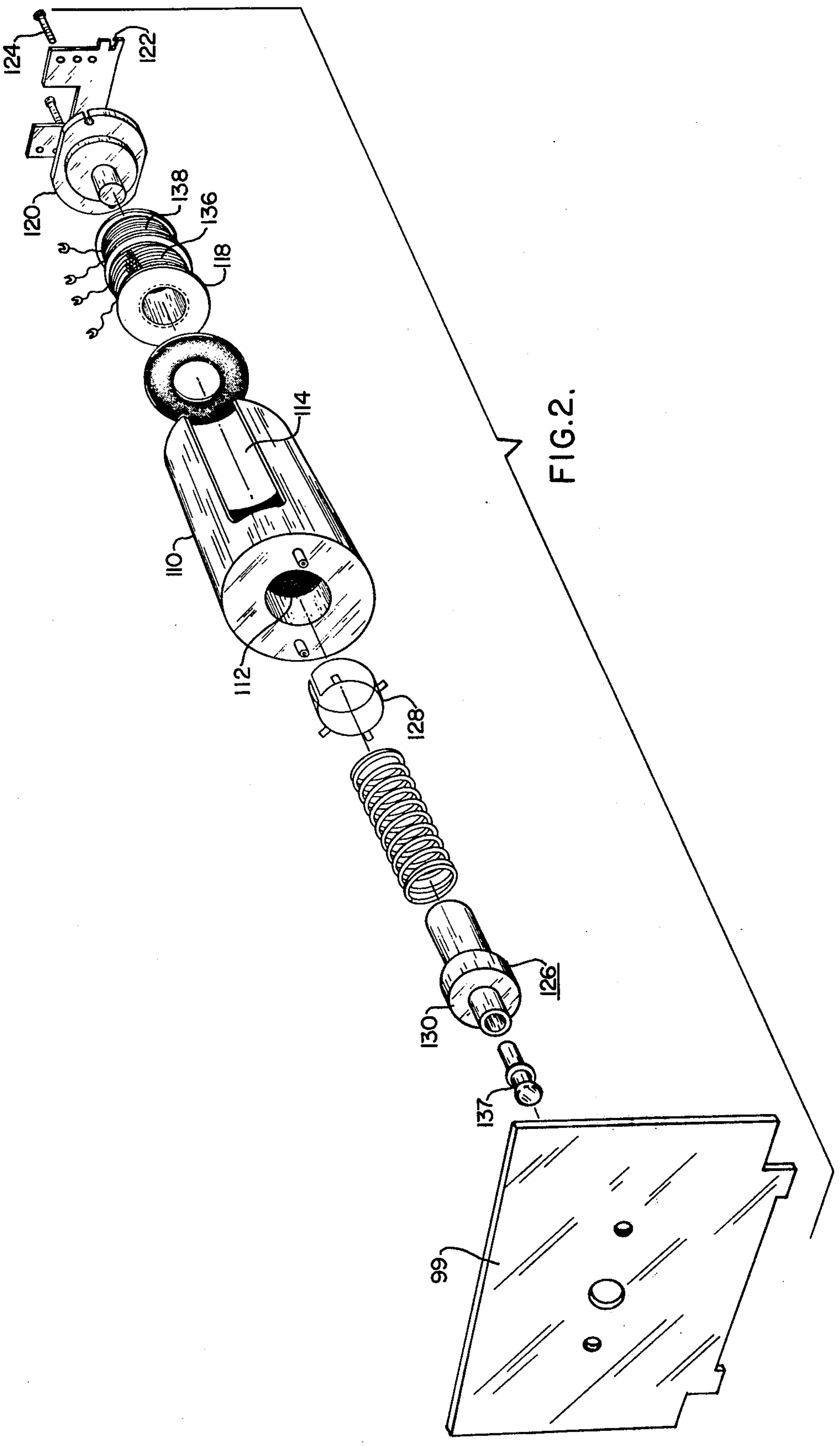
FIG. 2 is an exploded perspective view of the latch release actuator shown in FIG. 1.
Figure 3:
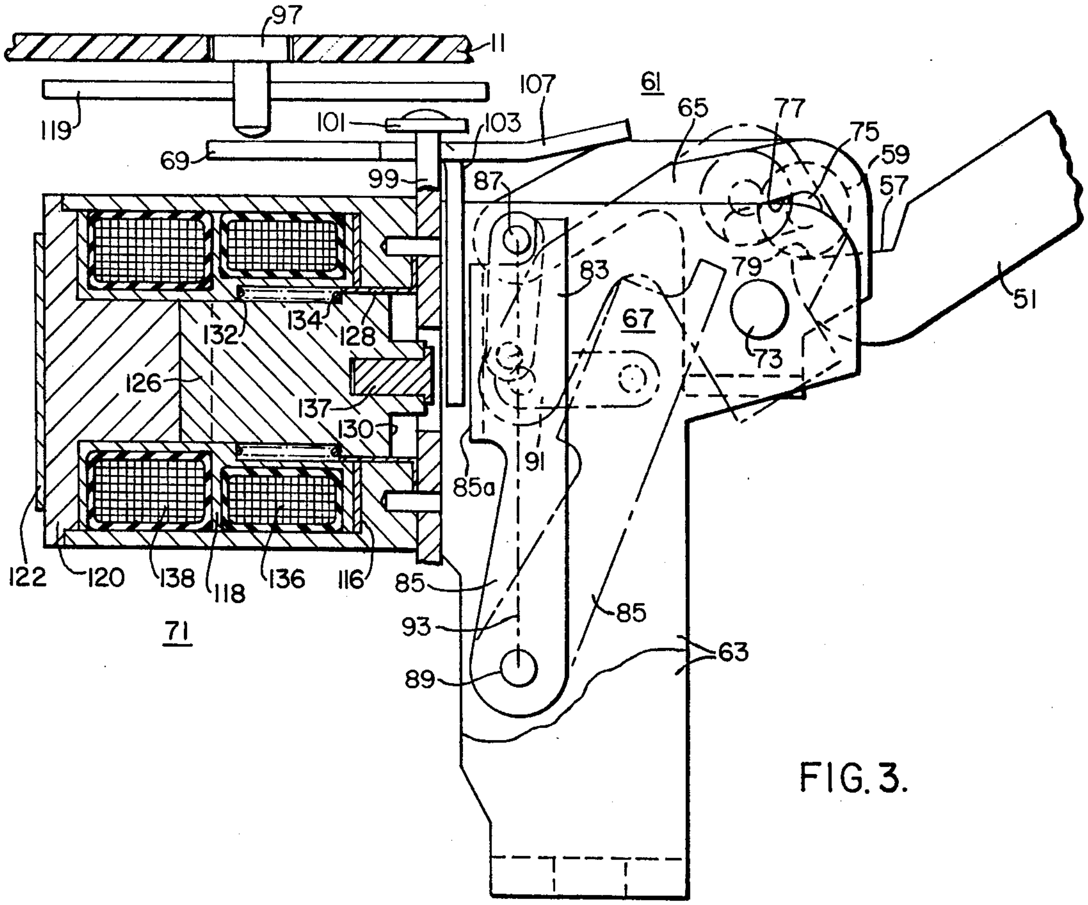
FIG. 3 is an enlarged elevational view, partly in section, of the latch release actuator and latch mechanism shown in FIG. 1.

The release actuator 71, shown most clearly in FIGS. 2 and 3, comprises a hollow cylindrical housing 110 having an open end, a closed end including an aperture 112, and a side slot 114. Coaxially mounted within the housing 110 and seated against the inner shoulder 116 (FIG. 3) thereof is a two-compartment coil form 118 of nylon or other suitable material. A plunger seat plate 120, of magnetic material, is positioned within the open end of the housing 110 and secured thereto by a back plate 122 and screws 124 which are threaded into the cross plate 99 to secure the release actuator 71 to the trip means 61. An operating member or plunger 126 of magnetic material is coaxially mounted within the housing 110 and coil form 118. Seated within the aperture 112 of the housing 110 is a brass bushing 128. Surrounding the plunger 126 and seated between a collar 130 thereof and a spring seat 132 of the coil form 118 is a bias spring 134.

Wound about the coil form 118 in the compartments thereof is a trip coil 136 and a holding coil 138. The leads of the two coils 136 and 138 extend through the side slot 114 of the housing 110 for connection, as will be hereinafter described. The plunger 126 includes a brass pin 137 seated therein for magnetic isolation purposes. As can be seen, the plunger 126 is reciprocally movable within the interior of the coil form 118 from a first condition or position against the plunger seat plate 120 as shown in solid lines in FIG. 3 to a second condition or position shown in dashed lines. The bias spring 134 urges the plunger 126 toward the second position.

Figure 4:
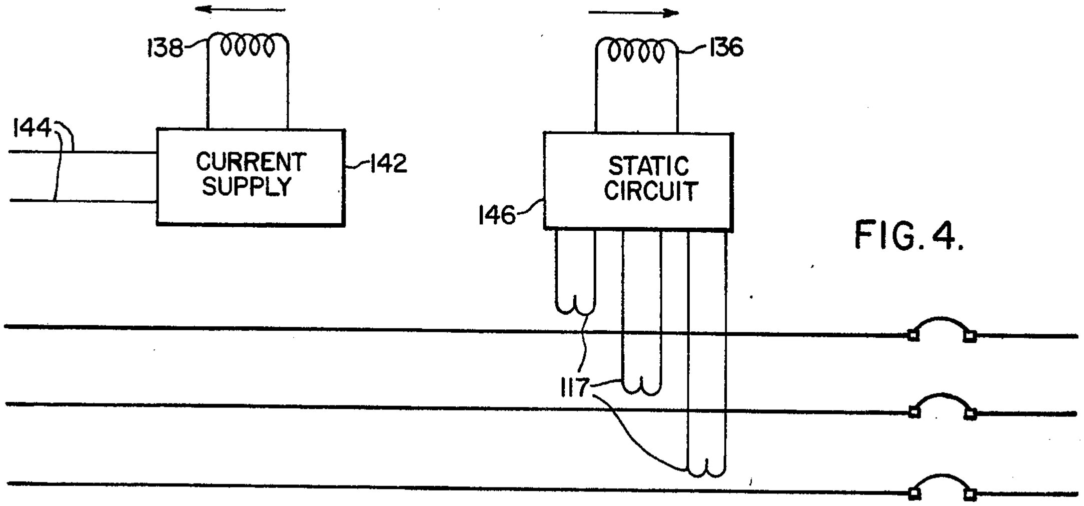
FIG. 4 is a schematic diagram of electrical circuits suitable for operating the latch release actuator of FIG. 2.

Referring now to FIG. 4, it can be seen that the holding coil 138 is connected to a current supply 142 which is, in turn, connected to a control line 144. The current supply 142 may be of the type described in copending U.S. patent application Ser. No. 595,183, entitled "Control Circuit For Undervoltage Release Coil" (W. E. 45,385), filed July 11, 1975, by Walter W. Lang and John T. Wilson and assigned to the assignee of the present invention.

The trip coil 136 is connected to a static circuit 146 which is, in turn, connected to three current sensing transformers 117. As can be seen in FIG. 1, a current transformer 117 is disposed about the conductor 31 of each pole of the circuit breaker 7. The static circuit 146 is mounted upon a static circuitboard 119 and is more completely described in U.S. Pat. No. 3,808,567, issued Apr. 23, 1974 to Alfred E. Maier et al and U.S. Pat. No. 3,818,275 issued June 18, 1974 to Alan B. Shimp, both of which patents are assigned to the assignee of the present invention.

When voltage upon the control line 144 rises above a first predetermined level, the current supply 142 energizes the holding coil 138, generating magnetic flux sufficient to draw the plunger 126 in against the action of the biasing spring 134 and maintain the plunger 126 in the position shown in solid lines in FIG. 3. Energizing current from the current supply 142 thus constitutes a first control signal to the release actuator 71. When the voltage on the control line 144 drops below a second predetermined level, the current supply 142 will deenergize the holding coil 138, allowing the bias spring 134 to return the plunger 126 to the position shown in dashed lines of FIG. 3, thereby actuating the trip means 61 in the manner hereinbefore described. Other means, not shown, of deenergizing the current supply 142 could also be included, thus providing a remote tripping capability.

The current transformers 117 sense the current flow through the conductors 31 of each pole of the circuit breaker 7. Upon overload conditions, the transformers 117 supply signals through other transformers (not shown) to the static circuit 146 which in turn provides a second control signal to the release actuator 71 to energize the trip coil 136. This produces magnetic flux to aid the bias spring 134 and overcome the action of the holding coil 138 to throw the plunger 126 to the position shown in dashed lines of FIG. 3 and actuate the trip means 61 to trip the circuit breaker 7 and open the contacts thereof.

The circuit breaker 7 may also be tripped by manual operation of a push-to-trip button 97. Such operation causes the button 97 to actuate the release lever 69 which is pivotally mounted at the upper end of the frame 63. The lever 69 includes a downturned portion 103 which is normally disposed adjacent the interconnecting portion of the lower link 85. Accordingly, when the manual button 97 is depressed against the horizontal portion of the lever 69, the downturned portion 103 thereof moves the pin 91 to the right of the line 93, thereby releasing the latched arm 51.

Resetting the circuit breaker 7, the trip means 61, and the latch release actuator 71 is accomplished by rotating the handle 49 (FIG. 1) in a clockwise direction so that a flange 123 on the operating lever 39 contacts and rotates the releasable arm 51 until the latched surface 57 is again in position for contact with roller 59. Simultaneously, a portion **49*a* of the handle engages the lever extension 107** to return the release levers to the latched positions.

The brass bushing 128 serves to control the dimensions of the nonmagnetic gap between the housing 110 and the plunger 126. This allows more precise balancing of the magnetomotive forces produced by the trip coil 136 and holding coil 138. The use of a hollow cylindrical housing, cylindrical coil form, and cylindrical plunger serves to give better dimensional control for the various components of the release actuator 71. This is an improvement over the shaped metal housings of prior art trip actuators.

The present invention provides a release actuator including an overcurrent trip actuation, an undervoltage release actuation, and remote trippling capability. This results in a compact device which is more readily applied to smaller circuit breaker frame sizes. It can be seen, therefore, that the invention provides a circuit breaker with a compact unitary release actuator providing multipole overcurrent tripping capability and undervoltage release capability without requiring pole-to-pole connecting mechanisms.

We claim:

1. A circuit interrupter comprising:

separable contacts;

releasable means operable upon actuation to effect automatic separation of said contacts; and a release actuator comprising:

a cylindrical plunger operable between first and second positions, said plunger actuating said releasable means when operated to said second position;

means for biasing said plunger toward said second position;

a holding coil coaxially wound about said plunger and operable when energized by a voltage above a predetermined value to oppose the action of said bias means and maintain said plunger in said first position; and a trip coil wound about said plunger and being coaxial and non-concentric with said holding coil, said trip coil operable upon energization by an overcurrent control signal to aid said bias means and overcome the action of said holding coil to operate said plunger to said second position.

2. A circuit interrupter as recited in claim 1 comprising a hollow cylindrical coil form surrounding said plunger and supporting said trip and holding coils, said plunger being reciprocatingly movable between said first and second positions within the interior of said coil form.

3. A circuit interrupter as recited in claim 2 wherein said coil form comprises an insulating flange separating said trip coil and said holding coil.

4. A circuit interrupter as recited in claim 3 comprising a hollow cylindrical housing of magnetic material surrounding said coil form and said coils.

5. A circuit interrupter as recited in claim 4 wherein said actuator comprises a bushing of nonmagnetic material coaxially mounted within said housing and disposed about said plunger.

6. A device for actuating the trip mechanism of a circuit breaker having separable contacts, comprising a cylindrical plunger operable between first and second positions, said plunger actuating said trip mechanism when operated to said second position;

means for biasing said plunger toward said second position;

a holding coil coaxially wound about said plunger and operable when energized by a voltage above a predetermined level to oppose the action of said bias means and maintain said plunger in said first position; and a trip coil wound about said plunger and being coaxial and non-concentric with said holding coil, said trip coil operable upon energization by an overcurrent control signal to aid said bias means and overcome the action of said holding coil to operate said plunger to said second position.

7. A device as recited in claim 6 comprising a hollow cylindrical coil form surrounding said plunger and supporting said trip and holding coils, said plunger being reciprocatingly movable between said first and second positions within the interior of said coil form.

8. A device as recited in claim 7 wherein said coil form comprises an insulating flange separating said trip coil and said holding coil.

9. A device as recited in claim 8 comprising a hollow cylindrical housing of magnetic material surrounding said coil form and said coils.

10. A device as recited in claim 9 comprising a bushing of non-magnetic material coaxially mounted within said housing and disposed about said plunger.

* * * * *